United States Patent [19]

Petersen

[11] Patent Number: 4,623,452
[45] Date of Patent: Nov. 18, 1986

[54] DOCKSIDE SYSTEM FOR THE COLLECTION AND DISPOSAL OF BILGE WATER AND WASTE OIL

[76] Inventor: Robert N. Petersen, 2025 Joliet Ct., Virginia Beach, Va. 23456

[21] Appl. No.: 777,047

[22] Filed: Sep. 17, 1985

[51] Int. Cl.$^4$ .................. B01D 21/02; B01D 21/30
[52] U.S. Cl. .................... 210/104; 210/114; 210/170; 210/172; 210/532.1
[58] Field of Search ............... 210/104, 114, 153, 170, 210/172, 416.5, 532.1; 137/140, 343, 356, 236.1

[56] References Cited

U.S. PATENT DOCUMENTS

| | | | |
|---|---|---|---|
| 2,573,907 | 11/1951 | Humphreys | 214/14 |
| 2,666,671 | 1/1954 | Kimmerle | 302/14 |
| 2,984,360 | 5/1961 | Smith | 210/104 |
| 3,115,888 | 12/1963 | Moyer | 210/114 |
| 3,565,252 | 2/1971 | Sheehy | 210/104 |
| 3,836,000 | 9/1974 | Jakubek | 210/104 |
| 4,014,791 | 3/1977 | Tuttle | 210/114 |
| 4,426,293 | 1/1984 | Mason et al. | 210/636 |

FOREIGN PATENT DOCUMENTS

| | | |
|---|---|---|
| 2835453 | 2/1980 | Fed. Rep. of Germany . |
| 154382 | 11/1981 | Japan . |
| 2068468 | 8/1981 | United Kingdom . |

*Primary Examiner*—Frank Sever
*Attorney, Agent, or Firm*—Griffin, Branigan & Butler

[57] ABSTRACT

A dockside system for the collection and disposal of bilge water, waste oil and the like is described for continuously evacuating waste liquids from waterborne vessels (16, 18) into a shore vacuum tank (24) and for simultaneously and automatically separating oil and water from the waste liquid. A continuous regulated vacuum is applied near the top of the vacuum tank (24) for sucking waste liquid, such as bilge water and oil, through tubes (30, 33, 82) into the tank. The tubes have manually operated on/off valves (34) at outer end portions thereof which are operated at the bilges of the waterborne vessels. Water and oil are separated in the tank and each is respectively and automatically pumped to a water and oil receiving station (28 and 26) by means of a water outlet (88) located near the bottom of the tank, an oil outlet (92) located a relatively small distance above the water outlet, an oil/water interface sensor (98) positioned vertically between the water and oil outlets, an upper liquid level sensor (96) in the tank positioned substantially above the water and oil outlets and a lower liquid level sensor (100) in the tank positioned below the upper liquid level sensor but above the water and oil outlets.

16 Claims, 3 Drawing Figures

DOCKSIDE SYSTEM FOR THE COLLECTION AND DISPOSAL OF BILGE WATER AND WASTE OIL

BACKGROUND OF THE INVENTION

This invention relates broadly to the art of boat or ship waste-liquid pumps, and more specifically, to a revolutionary new bilge water and waste oil collection and disposal system which can be established on shore, at dockside or similar mooring facilities, or otherwise separate from and independent of the vessel served.

As used in this application, the word "waste liquid" means bilge water, potable water, wash-down water, water contaminated by petroleum products, and petroleum products themselves such as fuel oils, gasoline, lubricating oils and hydraulic oil. A "vessel" refers to any waterborne vessel, craft, or structure which generates a "waste liquid" as defined above. Examples of vessels include waterborne ships, boats, barges, dredges, submarines, and off-shore structures such as oil rigs and navigational aids. "Waste oil receptacle" as used in the application refers to any container for receiving and storing waste oil, such as one or more 55 gallon drums, 275 gallon standard steel storage tank and all plastic tanks.

Waterborne vessels are often outfitted with on-board bilge pumps. However, the laws of major countries prohibit the discharge of oil in harmful quantities into or upon navigable or open bodies of water. Since bilge water is likely to be contaminated with oil, many of these vessels are also equipped with on-board oily water separators, which reduce the concentration of oil in the bilge water enough to permit legal discharge of the bilge water overboard.

The primary difficulty with such systems is their relatively large size, which generally precludes their installation aboard waterborne vessels less than 100 feet in length. Since these smaller vessels are not equipped with facilities for separating oil from bilge water, they routinely discharge "raw", or untreated, bilge water directly overboard, thereby violating laws and polluting public waters. Thus, the primary objective of this invention is to encourage compliance with existing pollution abatement laws while simultaneously affording all vessels the opportunity of disposing their waste liquid, such as bilge water and waste oil, in a legal and environmentally sound fashion, regardless of their ability to accommodate the added weight and space requirement of on-board oily water separators.

Another difficulty with present on-board oily water separators is their high cost, which generally precludes their installation aboard most all private vessels regardless of size, plus many smaller commercial vessels. Owners of these vessels often reason that the cost of an on-board system is not justifiable because of the relatively small fines that are likely to result in the event of detection, which itself is relatively improbable. Besides, they also reason, present on-board systems do not entirely eliminate all chances of a harmful oil spill. Thus, another objective of this invention is to afford all vessels the opportunity of disposing their bilge water and waste oil in an economical manner.

Another difficulty (alluded to in the above paragraph) with some present versions of on-board oily water separators is their high degree of sophistication and complexity. Malfunctions are commonplace, with consequent increased risk of a harmful discharge. Spare-parts, especially for vessels underway, may be unavailable to correct malfunctions. If operators and maintenance personnel are unable to resolve malfunctions and restore proper operation before bilge levels become critical, then the usual practice is to directly discharge the raw, untreated, environmentally harmful waste water overboard. This usually occurs at night or off shore in order to avoid detection and possible fines. Thus, another objective of this invention is to provide a simpler, more reliable, and easily maintained system for the collection and disposal of bilge water and waste oil than presently exists, which will significantly reduce the frequency of surreptitious and harmful discharges now occurring because of equipment malfunctions.

Another difficulty with some present versions of oil water separators is the requirement for constant manual monitoring of the effluent quality. Unintentional illegal discharges often occur because of operator inattention, sluggish reaction to system malfunctions, or absence of an operator from his post. Thus, another ojective of this invention is to provide a system for the disposal of bilge water and waste oil which operates satisfactorily without a human operator.

Yet another difficulty associated with present bilge pump systems is that liquid transport occurs because of positive (relative to ambient) differential pressures applied at or near the source of the waste liquid. This mode of pumping could, and often does, lead to unintentioanl harmful discharges because of leaks through connections and line fittings. Thus, another objective of this invention is to virtually eliminate the chance of a harmful discharge caused at connections by transporting waste liquids with negative differential pressure applied at or near the source of the waste liquid.

SUMMARY

According to principles of this invention, a bilge water and waste oil evacuation and disposal system is located at a permanent and fixed shore side facility and can serve any vessel moored or positioned at the facility. The system includes a continuous and automatically regulated vacuum (negative differential pressure) in a tank connected to a network of collection pipes and hoses (tubes) extending therefrom having valves at outer ends thereof. The valves are manually opened when the hoses are used for evacuating waste liquid. Otherwise, the hose valves remain closed. Waste liquid enters the tank through a stand pipe which extends above the tank before releasing the liquid into the interior of the tank through the perforated pipe which terminates near the bottom of the tank.

The vacuum tank is also part of a liquid processing system which automatically, and continuously, separates oil from water. Water and oil are thus fed to other receiving devices even as the waste liquid enters the tank. The system includes water and oil flow control devices having respectively water and oil outlets positioned near the bottom of the tank, with the water outlet being positioned somewhat below the oil outlet. An upper liquid level sensor is positioned in the tank substantially above the water and oil outlets for initiating flow of liquid from the tank to either the water receiving device or the oil receiving device, depending on the location of the oil/water interface level within the tank, through either the water outlet or oil outlet when the level of waste liquid in the vacuum tank rises to the level of the upper liquid level sensor. A horizontally mounted interface sensor is positioned in the tank vertically between the water and oil outlets for selecting flow of water through the water outlet to the water receiving device or flow of oil through the oil outlet to the oil receiving device depending on the position of the oil/water interface within the tank. The system further includes a lower liquid level sensor in the tank positioned substantially below the upper liquid level sensor but above the water and oil outlets for stopping the flow of waste liquid from the vacuum tank altogether when the level of the waste liquid in the vacuum tank falls to the level of the lower liquid level sensor. No further flow occurs through the oil or water outlets until the waste liquid level in the vacuum tank again reaches the upper liquid level sensor, or until manually initiated. The water receiving device includes a means for further separating water from oil and returning oil recovered therefrom back into the vacuum tank.

BRIEF DESCRIPTION OF THE DRAWINGS

The foregoing and other objects, features, and advantages of the invention will be apparent from the more specific description of preferred embodiments of the invention as illustrated in the accompanying drawings in which reference characters refer to the same parts throughout the different views. The drawings are not necessarily to scale, emphasis instead being placed upon illustrating principles of the invention in a clear manner.

Referring to FIG. 1, a shore 10 has a dock 12 extending out therefrom over water 14, which is, for example, a harbor, with the dock 12 being part of a marina. Two vessels 16 and 18, shown partially in schematic and partially in cross section, are moored at the dock 12 and are having their bilge-water 20 evacuated by the system of this invention.

Figure 1:
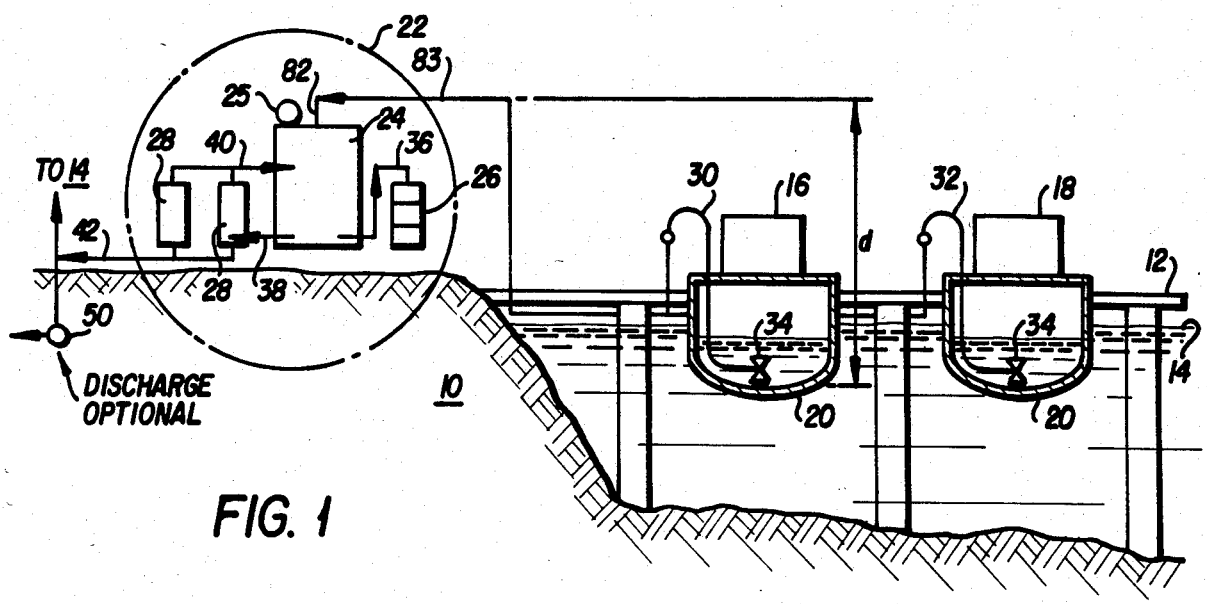
FIG. 1 is a side, partially-cross-sectional, partially schematic view of a shore line having a system of this invention mounted thereat for evacuating waste liquid from two vessels.

A main portion 22 of the system comprises basically a vacuum tank 24 having various outlets and sensors, a vacuum generating system 25, waste oil receptacles 26, a water purification system 28 and necessary pipes and hoses for interconnecting these various members. With regard to pipes and hoses, in the FIG. 1 embodiment, there are two evacuation hoses 30 and 32 collecting bilge water from the vessels 16 and 18 through a common collection pipe 33, which enters at the top of the vacuum tank 24. At the outer ends of each of these evacuation hoses 30 and 32, that is at the bilges, there is a hand actuatable valve 34 which isolates system vacuum from the waste liquid to be pumped.

A waste oil tube 36 leads from a port near the bottom of the vacuum tank 24 to waste-oil receptacles 26 and a waste water tube 38 leads from an outlet port slightly lower on the vacuum tank 24 to the water purification system 28. From the water purification system 28 there is a trickle return oil pipe 40 leading back to the vacuum tank 24 and a clean water pipe 42 leading from the water purification system 28 preferably to a sewer 50 (because higher oil concentrations are permitted), or navigable or other surface waters 14.

Figure 2:
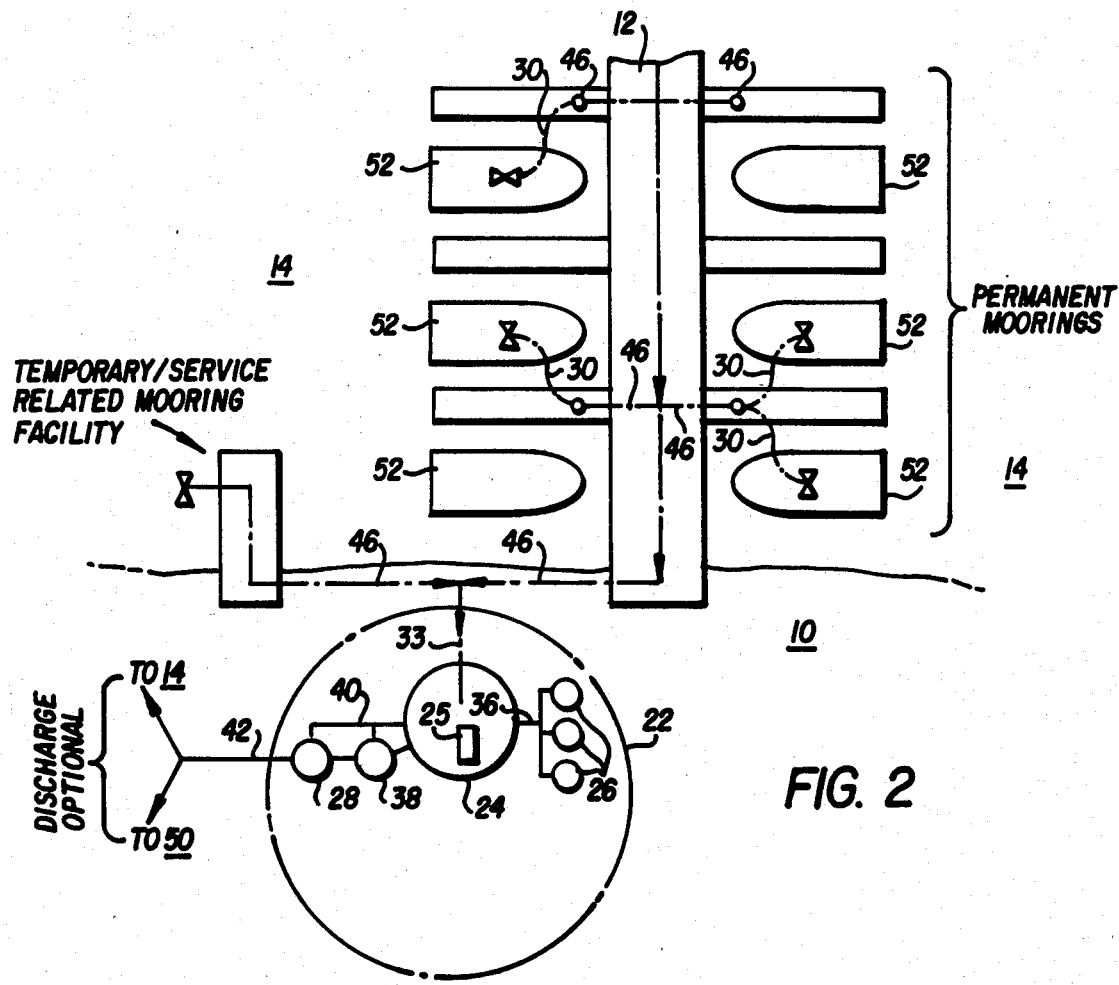
FIG. 2 is a top view of another configuration of the system of this invention mounted on a shore for evacuating waste liquid from many vessels moored at a dock; and, FIG. 3 is a schematic view of a dockside system of this invention for the collection and disposal of waste liquid.

FIG. 2 shows basically the same features as FIG. 1, but from a different perspective and with a couple of small modifications. In this respect, in the FIG. 2 embodiment there is still a single evacuation pipe 33 which enters the top of the vacuum tank 24, which branches out to secondary evacuation pipes 46. The branch evacuation pipes 46 lead to the bilges of boats 52 moored at the dock 12 via the hoses 30. The FIG. 2 drawing has the same reference numbers as the FIG. 1 drawing where the elements are basically the same. The actual configuration of piping and hoses to and along the waterfront depends on the preferences of a waterfront facility owner. Any combination of service connections is possible. Collection and disposal of bilge water and waste oil will still occur in basically the same manner as described herein, regardless of piping configuration and service connections.

Figure 3:
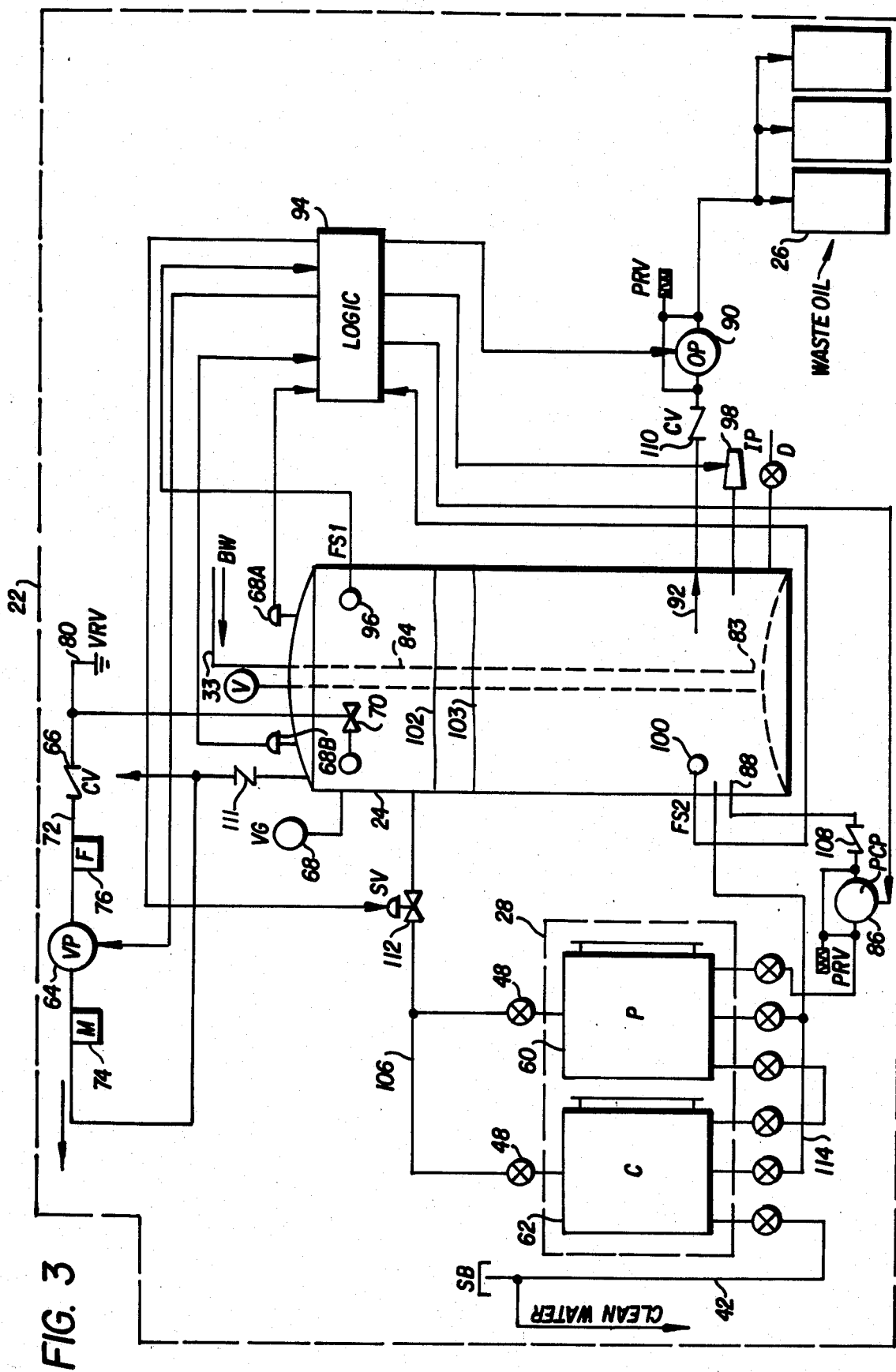

Turning now to FIG. 3 wherein many more details of the main portion 22 of the shore-facility bilge-water evacuator of FIGS. 1 and 2 can be seen, a vacuum is generated in the vacuum tank 24 by means of a vacuum pump 64 which is controlled by a vacuum switch 68A via logic 94 to maintain a continuous predetermined negative pressure in the vacuum tank 24 as measured by a vacuum gauge 68. In this respect, the vacuum switch 68A periodically activates the vacuum pump 64, via logic 94, as necessary to maintain a specific vacuum. A float valve 70 attached to the end of a vacuum line 72 protects the vacuum pump 64 from ingesting fluid by closing off vacuum line 72 should the waste liquid level rise above an upper liquid level sensor 96. A muffler 74 and a filter 76 are installed in the vacuum line 72 to cut down on noise and reduce impurities passing through the vacuum pump 64. A vacuum relief valve 80 is also installed in line 72 to permit air flow through the vacuum pump should the float valve 70 close the vacuum line 72. A check valve 66 is provided in the vacuum line 72 to prevent back rotation of the vacuum pump 64 once the vacuum switch 68A stops the vacuum pump 64.

Waste liquid, after rising through a height "d" (FIG. 1) enters a perforate stand pipe 82 at a point above the vacuum tank 24 and flows downwardly therethrough into the vacuum tank 24 through the perforate pipe 82. In this respect, the stand pipe 82 has small holes 84 along its length inside the vacuum tank 24 to enable even, nonturbulent deposit of waste liquid, and also to prevent syphoning from the vacuum tank back through the evacuator pipe 33 in the event of a loss of vacuum in tank 24. Waste liquid entering the vacuum tank 24 through the perforate pipe 82 can have both oil and water components, which will gravity separate in the tank 24, with the water on bottom and the oil on top. The water will be removed by a water pump 86 from a water outlet 88 and the oil will be removed by an oil pump 90 from an oil outlet 92. In this respect, both these pumps are controlled by the logic circuit 94 which receives input signals from an upper liquid-level switch 96 located far above the water and oil outlets 88 and 92, an interface probe 98 located between the water and oil outlets 88 and 92, and a lower liquid level sensor 100 located immediately above the outlets 88 and 92.

In operation of the main portion 22 of the evacuation system, when the waste liquid level 102 reaches the upper liquid level sensor 96, or when manually initiated, the logic circuit 94 responds thereto by energizing the interface probe 98, which in turn senses for the presence of an oil/water interface 103. If no oil/water interface 103 is detected by the interface probe 98, then the water pump 86 is energized by the logic circuit 94, which draws the water resting underneath any oil in the tank through water outlet 88 and check valve 108, and pumps it through water purification unit 28. Water pump 86 continues to lower the interface 103 and the waste liquid level 102 in the vacuum tank 24 until the interface probe 98 detects the presence of the oil/water interface 103, or until the waste liquid level 102 drops to the lower liquid level sensor 100, whichever occurs first. If the interface probe 98 detects an oil/water interface 103, then, under control of logic circuit 94, the water pump 86 stops and oil pump 90 starts, which draws only waste oil through the oil outlet 92 and check valve 110, and discharges it to waste oil receptacles 26 until the waste liquid level 102 falls to the lower liquid level sensor 100, at which time the oil pump 90 stops and the interface probe 98 deenergizes. If the waste liquid level 102 descends to the lower liquid level sensor 100 while water pump 86 is running prior to the detection of an oil/water interface 103 by the interface probe 98, the water pump 86 is stopped and the interface probe 98 is deenergized. The cycle is always complete whenever the waste liquid level 102 in the vacuum tank 24 drops to the lower liquid level sensor 100. If the interface probe 98 detects an oil/water interface 103 upon initial energization, then the oil pump 90 will start, drawing oil through oil outlet 92 and check valve 110, discharging it to waste oil receptacles 26. It should be noted that upon initial start up of the system, "fresh seed water" must be introduced inside the vacuum tank to at least the level of the interface probe 98. This ensures proper control of the oil and water pumps. When the liquid level 102 in the tank 24 drops to the lower liquid level sensor 100, the oil pump 90 will stop, and the interface probe 98 will deenergize. If, when the oil pump 90 is operating, additional water is added to the tank causing the oil/water interface 103 to rise above the level of the interface probe 98, then the interface probe will cause the oil pump 90 to stop, and cause the water pump 86 to start. The cycle will again proceed as previously described until the lower liquid level sensor 100 ultimately stops the oil pump 90.

Water which is discharged by the water pump 86 to water purification unit 28 is further processed by this unit to lower the concentration of oil in an effluent line 42 to legal disposal limits. A prefilter 60 contains a filter element (not shown), common in the art, which first removes particulate matter and causes a certain degree of oil and water separation, the oil floating to the top of the prefilter 60. The water then enters the coalescer 62. The coalescer 62 contains one or more chemically treated cartridges or elements (not shown), common in the art, which further separates oil and water, the oil floating to the top of the coalescer 62. The water from coalescer 62, now of acceptable oil concentration for disposal, enters effluent line 42, thence into either a navigable or surface body of water 14 or preferably a sanitary sewer 50.

Oil which floats to the top of the prefilter 60 and/or coalescer 62, is automatically returned at a very slow flow rate to the vacuum tank 24 through return pipe 106, flow control valves 48 and solenoid valve 112. Solenoid valve 112 is normally closed, but is opened and closed by logic 94 simultaneously with energization/stopping of the water pump 86, thereby allowing flow through the return line 106. Flow control valves 48 restrict and regulate the flow of liquid back to the tank 24. This liquid may be oil, which has floated to the top of the prefilter 60 or coalescer 62, or may be water if there is no oil. The purpose of this return feature is to prevent oil buildup within the prefilter 60 and coalescer 62, which would eventually cause short circuiting of the prefilter 60 and coalescer 62, thereby probably causing a harmful oil discharge to the environment. A line 114, with valves, interconnects the bottoms of the prefilter 60 and the coalescer 62 with the vacuum tank 24 to allow draining of these members for replacing filter elements when the system is partially shut down.

Waste oil receptacles 26 can be one large container rather than the small ones shown in FIG. 2.

To prevent generation of positive differential pressures within the vacuum tank 24 in the event of a power failure or vacuum pump malfunction, which would violate codes and create a safety hazard, a check valve 111 with a lightweight valve member is installed in a tank vent line, which itself is further connected to the vacuum pump exhaust line. The check valve 111 permits escape of fumes and vapors to the atmosphere if internal differential pressures in tank 24 shift from negative to positive. Another more expensive approach would be to use a solenoid valve in place of the check valve 111, coupled to another vacuum switch and the main power line, which would open in the event of a power failure or loss of vacuum.

The oil/water interface probe 98 can be a capacitance probe as is well known in the art. In the preferred embodiment, the water pump 86 and oil pump 90 are progressive cavity pumps. Both are capable of drawing liquid against the vacuum in the tank 24. It is not thought necessary to further describe the liquid level sensors inasmuch as these are standard electrical float switches, which are old in the art.

In the presently preferred embodiment the following elements are used:
manual valves 34—1 inch HAYWARD PVC ball valves
prefilter cartridge 60—Velcon FO 614PLF-5
coalescer cartridge 62—Velcon CA 61104-A
interface probe 98—Robertshaw 304B-B2-05W/740-B1-A006 probe
vacuum pump 64—Gast 1022-V2G272X
water pump 86—Moyno 33359
oil pump 90—Moyno 34459

Bilge-water and/or waste oil (waste liquid) is delivered into the vacuum tank 24 through the perforate pipe so as to cause as little disturbance in any existing oil and water layers as possible. Disturbance of the water and oil layers in the vacuum tank 24 is also minimized by selecting a vacuum pump 64 that will cause a liquid flow in the evacuation pipe 33 of approximately five gallons a minute. To determine the proper vacuum setting in the system, one must first know the approximate value of the maximum "d" in FIG. 1, which is the height to which the waste liquid must be lifted from the bilges of vessels. In order to lift water ten feet above sea level, a vacuum (negative differential pressure) of approximately ten inches of mercury is required. Stated more exactly, the ratio is 29.92 inches of mercury/33.9 feet of water, although this changes somewhat depending on the type of water pumped and its mixture with oil. In any event, one must select the vacuum generating system 25 so that sufficient vacuum will be available to lift the waste liquid to a height of "d" and then maintain the desired flow of about 5 gpm through the evacuation pipe 33 (FIG. 2). By knowing "d", the size of the evacuation pipe 33, and the length of its branch lines, plus the number of valves 34 that can be opened at one time, one can determine the vacuum and air flow rate required to achieve a non-emulsifying flow rate of close to five gallons a minute. The vacuum pump 64 and the motor driving it should be sized to always maintain a vacuum within the vacuum tank 24 and maintain a flow rate of close to, but less than five gallons a minute when bilge-water is being evacuated.

In operation, the system is installed or established at a shore facility, such as on a fixed or floating pier, or on land as depicted in FIGS. 1 and 2. Before the system is activated for the first time, "seed water" is introduced into the vacuum tank 24 with its level being at or above the oil/water interface probe 98. The system is then initially activated by starting up the vacuum pump 64 which builds up a vacuum in the vacuum tank 24 of a predetermined amount which will cause a bilge-water flow through the collection piping 46, 33, and 82 of something around five gallons a minute when the system is being used. Once this predetermined vacuum is reached, the vacuum switch 68A, via logic 94, automatically turns off the vacuum pump 64. This vacuum is initially maintained within the vacuum tank 24 without further pumping by the vacuum pump 64 because all hose valves 34 (FIG. 1) are initially closed, check valves 66, 108, 110, and 111 prevent flow into the tank resepectively at vacuum line 72, water outlet 88, and oil outlet 92, and vent line 113, and solenoid valve 112 at the oil trickle line 106 is closed. Thus, except for system leakage through joints the vacuum is maintained without further running of the vacuum pump 64 until an operator at a vessel 52, 16, or 18 moored near the system wishes to pump waste liquid (such as contaminated bilge water or oil directly from an engine sump). In order to do this, the operator brings, or is handed, an evacuator hose 30 onto the vessel 52, 16, or 18, inserts the end thereof into the bilge or engine sump of the vessel 52, 16, or 18, and opens the valve 34 (FIG. 1). Immediately upon doing this, vacuum within the vacuum tank 24 sucks the bilge-water and/or waste oil (waste liquid) into the vacuum tank 24 at stand-pipe 82 and outlet 83 and liquid level 102 in the vacuum tank 24 begins to rise. As this happens, the air space in which the vacuum is created becomes smaller, and the vacuum is therefore decreased. Vacuum switch 68A senses a loss in vacuum and again starts the vacuum pump 64 to maintain the predetermined vacuum, thus automatically maintaining the desired five gallon per minute flow and lift capability through height "d". The vacuum pump 64 is cycled off and on by the vacuum switch 68A as is required to maintain this vacuum. Eventually, the waste liquid level 102 reaches the upper liquid level sensor 96 and the logic circuit 94 responds by going through a cycle of the main portion 22 of the evacuator system as previously described.

Once an operator has completely evacuated bilge-water or waste oil from the vessel, such as vessel 16 in FIG. 1, he or she closes the valve 34, thereby preventing further suction through the evacuation hose. At this point, the vacuum switch 68A, which has been maintaining a predetermined vacuum within the vacuum tank 24, turns off the vacuum pump 24 after reaching its upper control point and the vacuum is maintained within the vacuum tank 24 until an evacuation hose valve 34 is again opened, or until any leakage into the system causes the vacuum switch 68A to start the vacuum pump 64.

It will be understood by those skilled in the art that the dockside system for the collection and disposal of bilge water and waste oil described herein is quite useful for evacuating the bilges of small vessels which do not have enough room for bilge processing equipment thereon. Further, it will be appreciated that the system described herein, since it uses negative differential pressure generated at the receiving, down stream end, rather than positive differential pressure generated at the bilge end, or source of waste liquid, to transport the liquid, will normally leave the evacuation hoses and piping 30, 32, and 33 in FIG. 1 and 33 and 46 in FIG. 2 in a dry condition so that they are not as vulnerable to rotting, decaying, freezing, leaking, and the like. Further, the system described herein provides fully automated separation and disposal of oil and water so that the evacuation system can continually operate without the requirement of a special operator being continually at the system. It is only required that someone be at the outer ends of the evacuation hoses to open the valves 34 thereat for allowing the device to suck bilge-water therein. All other activities of the system are handled automatically. Still further, it will be appreciated that the system described herein can be made accessible to not just one, but many users, thereby spreading the expense of owning and operating the system among many beneficiaries.

Still further, it will be appreciated by those skilled in the art that the system described herein is extremely uncomplicated and will provide dependable operation.

While the invention has been particularly shown and described with reference to a preferred embodiment, it will be understood by those skilled in the art that various changes in form and detail may be made therein without departing from the spirit and scope of the invention. In this regard, it should be understood that a shore facility could be a floating island. Also, initiation of a disposal cycle of the system of this invention could be done manually rather than by using the liquid-level switch 96.

The embodiments of the invention in which an exclusive property or privilege is claimed are defined as follows:

1. A waterborne vessel waste-liquid evacuator system to be mounted at a single facility for individually evacuating a plurality of vessels brought adjacent thereto, said system comprising a means for evacuating bilges and the like of said vessels positioned at points adjacent to said single facility by inserting the end of a tube into waste liquid of said vessels, whereupon the waste liquid therefrom is automatically transferred and deposited into a vacuum-tank means of said waste-liquid evacuator system and thereafter automatically separated into oil and water and respectively transferred to oil and water receiving means, said means for evacuating being further defined by and/or including:

said vacuum-tank means providing a closed reservoir having a waste liquid inlet and an air evacuation outlet located near the top of said vacuum tank means, a water outlet located near the bottom of said vacuum tank means and an oil outlet located a relatively small distance above said water outlet, but a relatively great distance below said air-evacuation outlet;

said tube being attached to said vacuum tank means at said waste liquid inlet for extending into the waste liquid of vessels floating near said single facility;

a vacuum producing means coupled to said vacuum tank means at said air-evacuation outlet for evacuating air therethrough from said vacuum-tank means to cause a continuous vacuum in said vacuum-tank means and thereby to cause waste liqiud to be sucked through said hose into said vacuum tank means at said waste liquid inlet;

said water receiving means being coupled to said vacuum-tank means at said water outlet for receiving water separated from said vessel waste liquid in said vacuum tank means, said water receiving means including a water-flow control means for controlling the flow of water from said vacuum-tank means to said water receiving means;

said oil receiving means being coupled to said vacuum-tank means at said oil outlet for receiving oil separated from said vessel waste liquid in said vacuum tank means, said oil receiving means including an oil-flow control means for controlling the flow of oil from said vacuum-tank means to said oil receiving means; and a control system comprising an upper liquid-level sensor in said vacuum-tank means positioned substantially above said water and oil outlets and being coupled to an oil/water interface sensing means for enabling said oil/water interface sensing means when the level of waste liquid in said vacuum-tank means rises to a level substantially above said water and oil outlets, said oil/water interface sensing means being positioned inside said vacuum-tank means vertically between said water outlet means and said oil outlet means and being coupled to said water-flow control means and said oil-flow control means for, when enabled, only providing flow of water from said vacuum-tank means through said water outlet to said water receiving means in response to not sensing an oil/water interface intermediate said water and oil outlets and for only providing flow of oil from said vacuum-tank through said oil outlet to said oil receiving means in response to sensing an oil/water interface intermediate said water and oil outlets; and, said control system further comprising a lower liquid level sensor in said vacuum-tank means positioned below said upper liquid level sensor but above said water and oil outlets and being coupled to said interface sensing means for disabling said interface sensing means and for causing the cut off of flow of oil and water from said vacuum-tank means through said oil and water outlets to said oil and water receiving means when the level of waste liquid in said vacuum-tank means fails to said level at said lower liquid level sensor;

whereby the operators of vessels desiring to have their bilges and the like evacuated can moor at points adjacent to said single facility and insert the end of said tube into the waste liquid of their vessels, whereupon the waste liquid therefrom will be automatically transferred and deposited into the vacuum-tank means and thereafter automatically separated into oil and water and respectively transferred to said oil and water receiving means.

2. An evacuator system as in claim 1, wherein is further included a pressure sensor positioned inside said vacuum-tank means and coupled to said vacuum producing means for maintaining a continuous regulated vacuum at a predetermined level.

3. An evacuator system as in claim 2, wherein is further included a valve mounted in the outer end of said tube for selectively manually opening and closing said tube thereat.

4. An evacuator system as in claim 3, wherein there are a plurality of hoses, each having a valve thereon.

5. An evacuator system as in claim 2, wherein said predetermined pressure maintained by said vacuum producing means and measured by said pressure sensor is sufficient to maintain a flow of about five gallons a minute through said tube.

6. An evacuator system as in claim 1, wherein said water receiving means is for further separating water and oil and is coupled to the vacuum tank for returning oil separated therefrom to said vacuum tank.

7. An evacuator system as in claim 1, wherein the waste liquid inlet into said vacuum-tank means comprises a stand pipe which extends from inside said vacuum-tank means at a point near the bottom of the vacuum tank means out the top of said vacuum tank means and is thereafter coupled to said tube.

8. An evacuator as in claim 7 wherein said stand pipe has holes along the length thereof to prevent siphoning of waste liquid therethrough from said vacuum-tank means.

9. An evacuator system to be mounted at a single facility for evacuating waste liquid from a plurality of waterborne vessels, said evacuator system comprising a means for evacuating bilges and the like of said vessels located at positions adjacent to said single facility by inserting the distal end of a tube into the waste liquid of said vessels and opening a tube valve whereupon the waste liquid will automatically pass through said tube and be deposited into a vacuum tank means, said means for evacuating being further defined by and/or including:

said vacuum-tank means providing a closed reservoir having a waste liquid inlet, an air-evacuation outlet, a water outlet and an oil outlet;

said tube having a proximate and which is attached to said vacuum tank means at said waste liquid inlet with said distal end being for extending into the waste liquid of vessels floating near said single facility, said tube including a valve near said distal end thereof for selectively opening and closing said tube;

a vacuum producing means coupled to said vacuum tank means at said air-evacuation outlet for evacuating air from said vacuum-tank means for causing a continuous, regulated, vacuum in said vacuum-tank means and thereby to cause said waste liquid to be sucked through said tube into said vacuum tank means; and a control system comprising a pressure sensor positioned inside said vacuum-tank means and coupled to said vacuum producing means for maintaining said vacuum at a predetermined level;

whereby the operators of vessels desiring to have their bilges evacuated can move their vessels to a postion adjacent to said single facility and insert the distal end of said tube into the waste liquid of their vessels and open said tube valve whereupon the waste liquid will be automatically deposited into the vacuum tank means.

10. An evacuator system as in claim 9, wherein is further included a water receiving means and an oil receiving means coupled to said vacuum tank means and is further included flow control means for controlling the flow of oil and water from said vacuum tank means to said oil and water receiving means respectively so as to separate oil and water within said vacuum tank means and deposit said items respectively in said oil and water receiving means.

11. An evacuator system as in claim 9, wherein there are a plurality of hoses and each of said hoses has a valve at a distal end thereof.

12. An evacuator system as in claim 9, wherein said predetermined pressure maintained by said vacuum producing means and measured by said pressure sensor is sufficient to maintain a waste liquid flow of around five gallons a minute through said tube.

13. An evacuator system as in claim 9, wherein said water receiving means is for further separating water and oil and is coupled to the vacuum tank for returning oil separated therefrom to said vacuum tank.

14. An evacuator system as in claim 9, wherein the liquid inlet into said vacuum-tank means comprises a stand pipe which extends from inside said vacuum-tank means at a point near the bottom of the vacuum-tank means to above the top of said vacuum-tank means and is thereafter coupled to said tube.

15. An evacuator system as in claim 14, wherein said pipe has holes along the length thereof to prevent siphoning of liquid therethrough from said vacuum-tank means.

16. An evacuator system as in claim 9, wherein said control system includes a means for preventing a positive pressure in the vacuum tank of a predetermined level in case of a malfunction of the system.

* * * * *